Jan. 14, 1958 S. LE FIELL 2,819,683
MEAT TRUCK AND TRACK SYSTEM THEREFOR
Filed Dec. 21, 1954 2 Sheets-Sheet 1
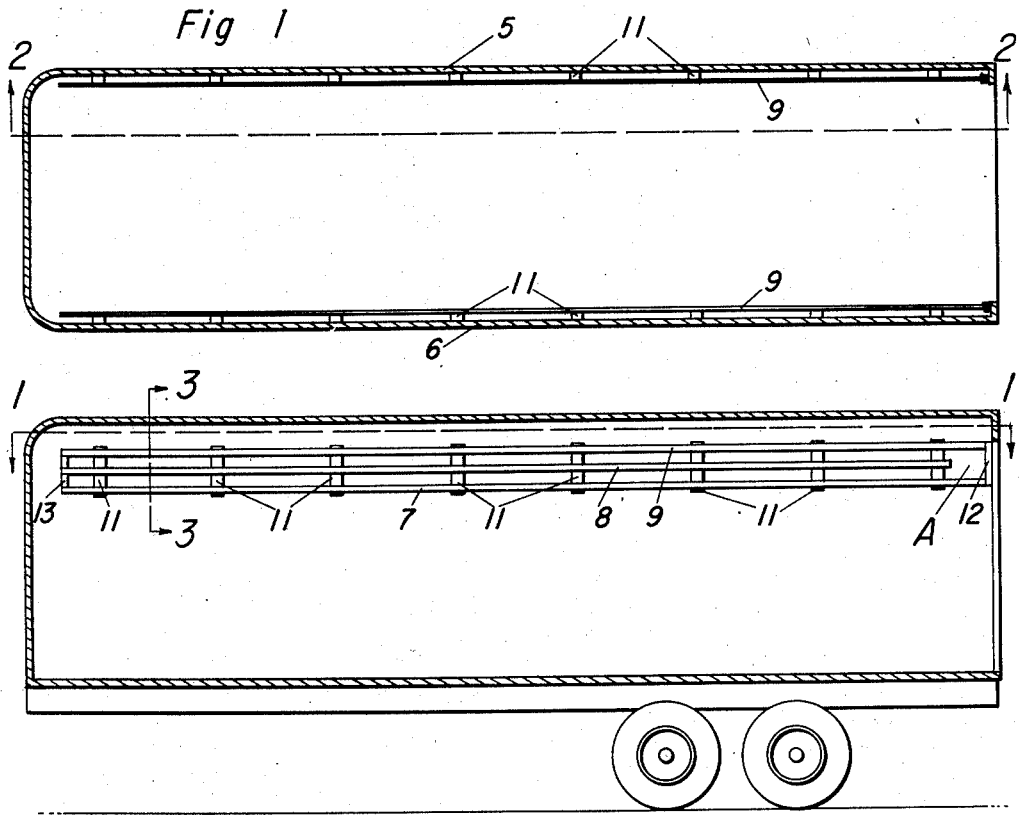
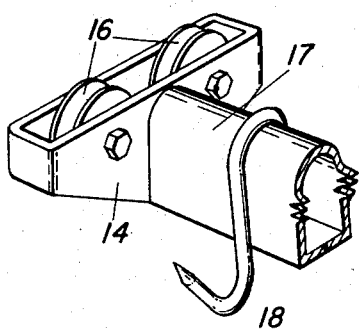
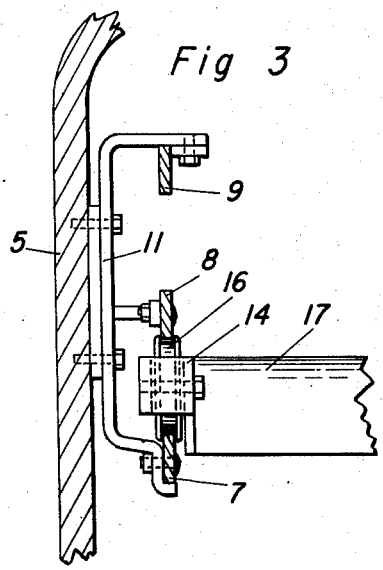
INVENTOR.
Sidney Le Fiell
BY
Att'y Jan. 14, 1958 S. LE FIELL 2,819,683
MEAT TRUCK AND TRACK SYSTEM THEREFOR
Filed Dec. 21, 1954 2 Sheets-Sheet 2
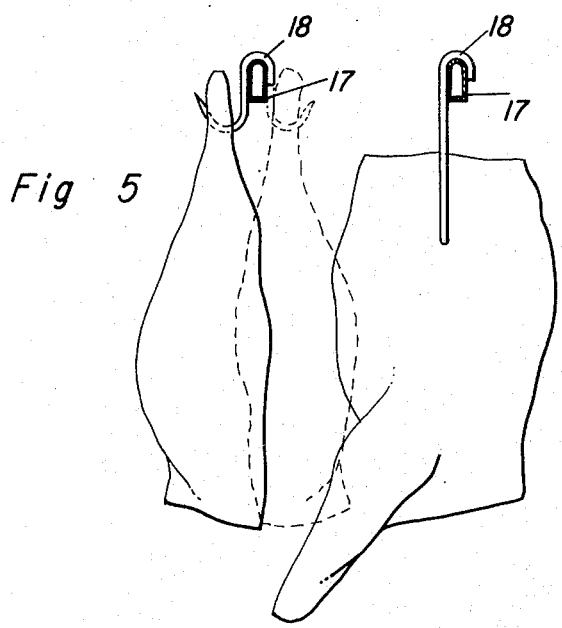
Fig 5
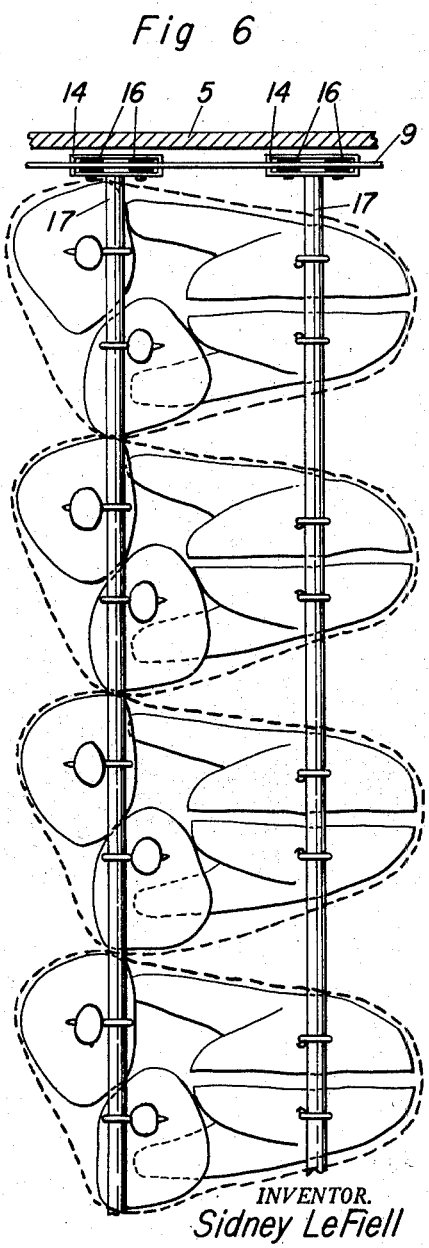
Fig 6
INVENTOR.
Sidney LeFiell
BY
Att'y

United States Patent Office 2,819,683
Patented Jan. 14, 1958

2,819,683

MEAT TRUCK AND TRACK SYSTEM THEREFOR

Sidney Le Fiell, San Francisco, Calif.

Application December 21, 1954, Serial No. 476,771

3 Claims. (Cl. 104—98)

This invention relates to improvements in track systems for meat delivery trucks and the like.

The principal object of this invention is to provide a track and hanger arrangement for transporting dressed meat such as the hind and fore quarters of beef.

A further object is to provide means for segregating the individual sections of a single animal.

A further object is to provide means whereby the meat may be moved from one end of the truck to the other with a minimum amount of effort.

A further object is to provide means for transferring the conveying bars to an upper track for storage purposes.

A further object is to provide an arrangement which may be mounted in any standard truck or trailer without materially altering its construction.

Other objects and advantages will be apparent during the course of the following description.

In the accompanying drawings forming a part of this specification and in which like numbers are employed to designate like parts throughout the same, Fig. 1 is a cross sectional view taken on the line 1—1 of Fig. 2 and showing the track arrangements on the sides of the truck body;

Fig. 2 is a cross sectional view taken on the line 2—2 of Fig. 1;

Fig. 3 is an enlarged detailed cross sectional view taken on the line 3—3 of Fig. 2;

Fig. 4 is a fragmentary perspective view of one of the cross bars and wheeled carriage;

Fig. 5 is a diagrammatic view showing the arrangement of beef on the hangers; and Fig. 6 is a diagrammatic view showing the arrangement of the fore and hind quarters of an individual animal.

In the transporting of meat it has been common practice to hang the various quarters or halves of a beef on cross bars from hooks positioned on the cross bars and in so doing it has been customary to load the vehicle by carrying the various portions of the carcass from the rear door to the front of the vehicle and then hanging the meat from the cross bars. This requires a considerable amount of effort as the various quarters of the beef are heavy and if dropped become soiled, bruised. Therefore it is essential that the meat be carefully handled.

After each cross bar has been loaded from the front toward the rear of the truck, the doors are closed and the meat is transported to points of discharge. At each such point the operator must then unload in a reverse manner from that of loading.

Applicant has therefore devised a means whereby the carrying of the portions of beef from one end of the vehicle to the other is eliminated by providing cross bars which are mounted upon rollers. After the meat has been lifted from the rollers, the empty cross bar may be slightly elevated and stored out of the way of succeeding cross bars that are being moved toward the back of the vehicle.

It is obvious that in loading the vehicle, the empty cross bars are dropped into position for use and then moved from the rear toward the front of the vehicle after being loaded.

In the accompanying drawings, wherein for the purpose of illustration is shown a preferred embodiment of my invention, the numerals 5 and 6 designate the sides of a vehicle, whether it be a truck or trailer, and to the sides thereof I secure parallel tracks 7, 8 and 9 through the medium of hangers 11.

By viewing Fig. 2 it will be noted that the tracks 7 and 9 have their ends connected by separators 12 and 13. It will be noted that the track 8 is shorter than the other tracks, so as to provide an opening between its end and the separator 12.

Between the tracks 7 and 8 I mount wheeled carriers 14, each having wheels 16, and opposite carriers on opposite sides of the vehicle which are connected by a cross bar 17. By viewing Fig. 3 it will be noted that the diameter of the wheels 16 is slightly less than the distance between tracks 7 and 8 and 8 and 9.

The result of this construction is that the flanges of the wheels 16 serve to maintain the carriers on the tracks during their travel and at the same time prevent any binding action through twisting of the cross bar during its travel from one end of the track to the other.

Hooks 18 are employed for hanging the beef, there being two different types of hooks as shown in Fig. 5, one for the hind quarter and one for the fore quarter.

By viewing Figs. 5 and 6 it will be noted that by arranging the fore and hind quarters in specific groups, all of the parts of a single animal will be kept together. The grouping is shown in Fig. 5 by dotted lines.

This is important for the reason that in delivering meat, a person may select a particular steer which is given a particular mark, and therefore the purchaser wishes to receive the meat from that particular steer, then, by hanging the hind quarters alternately and the fore quarters side by side, the meat from one animal will be segregated for quick removal at the point of delivery, with the assurance that the purchaser is getting the particular meat that he has ordered.

In use we will assume that all of the empty cross bars and their carriers are mounted upon the rail 8.

The loader then pulls the rear-most cross bar rearwardly off of the end of the opposed rails 8, with the result that the wheels of the carrier will drop through the opening A and on to the rails 7. A row of fore quarters will then be hung upon the cross bar and the entire cross bar shoved toward the front of the vehicle.

The next cross bar and its carriers will likewise be dropped on to the rails 7 and loaded with hind quarters, the same being arranged as shown in Figs. 5 and 6. The cross bar will then be moved toward the forward end of the vehicle and succeeding cross bars will be moved into place and loaded.

The unloading is a reversal of the loading with the exception that when the cross bar is unloaded, the bar and its wheels are merely raised upwardly so the wheels pass through the opening A and on to the storage rail 8.

Thus it will be apparent that a great deal of labor has been saved through the fact that the beef may be quickly moved from one end of the truck to the other without walking the entire length of the truck body with each individual piece of meat.

By arranging the cross bars so that they may be stored out of the way or moved into place in an efficient manner, also promotes speed in the handling of meat.

It will thus be seen that I have accomplished all of the objects above set forth. It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. In combination with a vehicle body having spaced parallel side walls, of a plurality of spaced rails attached to the opposed sides of said side walls, and in groups of three, said rails being arranged parallel to each other and extending substantially the length of said side walls, the top and bottom rails of each group being connected by spacers, the end of middle rail of each group being spaced from one of said spacers at one end of the group to form a transfer opening, and opposed wheeled carriers mounted on opposed corresponding rails of each of said groups and a bar connecting the opposed carriers.

2. A commodity handling arrangement comprising two pairs of opposed spaced tracks arranged parallel to each other and at the same vertical elevation, a third track spaced between the tracks of each pair, said third track being shorter than its adjacent tracks, a carrier having spaced flanged wheels engaging one of the tracks and its next above adjacent track, a second flanged wheeled carrier mounted on the opposite parallel track, and a bar extending between said opposed carriers whereby said carriers move simultaneously on their opposed tracks and may be elevated or lowered simultaneously from said lower to middle track.

3. In combination with a movable vehicle body having spaced parallel side walls, of spaced rails secured to the opposed surfaces of said walls and at the same elevation, said spaced rails comprising groups of three rails equally spaced vertically to provide an upper, a middle and a lower rail, said middle rail being at one end shorter than the other two of said rails, a bar connecting the ends of said upper and lower rails and adjacent the shorter end of said middle rail to form a transfer opening, and flanged wheel carriers mounted on said opposed rails, the wheels of said carriers having diameters slightly less than the distance between said rails, whereby the flanges of said wheels will engage the supporting rail upon which said carriers move and the rail above, said wheeled carriers mounted on said opposed rails being connected with a cross bar.

References Cited in the file of this patent

UNITED STATES PATENTS

| | | |
|---|---|---|
| 1,095,073 | Bish | Apr. 28, 1914 |
| 1,341,996 | Plucienski | June 1, 1920 |
| 1,397,558 | Steedman | Nov. 22, 1921 |
| 1,602,271 | Kilcurr | Oct. 5, 1926 |
| 1,622,574 | Deady | Mar. 29, 1927 |
| 1,641,458 | Russell | Sept. 6, 1927 |
| 1,672,092 | Russell | June 5, 1928 |
| 2,146,533 | Erickson | Feb. 7, 1939 |
| 2,236,103 | Lohner et al. | Mar. 25, 1941 |
| 2,437,486 | Staiger | Mar. 9, 1948 |
| 2,683,890 | Rosenbaum | July 20, 1954 |
| 2,702,114 | Jensen | Feb. 15, 1955 |